(12) United States Patent
Filin

(10) Patent No.: US 6,400,894 B1
(45) Date of Patent: Jun. 4, 2002

(54) FILMING VIDEO DISPLAY SCREENS

(76) Inventor: Thomas Filin, 31 Romany Lane, Tilehurst, Reading Barks (GB), RG30 8AP ( * ) Notice: Subject to any disclaimer, the term of this patent is extended or adjusted under 35 U.S.C. 154(b) by 0 days.

(21) Appl. No.: 09/067,275

(22) Filed: Apr. 27, 1998

(30) Foreign Application Priority Data

May 1, 1997 (GB) .............................................. 9708940

(51) Int. Cl.[7] .......................... H04N 5/765; H04N 5/77
(52) U.S. Cl. ...................................... 386/128; 386/117
(58) Field of Search ................................. 386/128, 131, 386/129, 130, 117, 107, 38, 46, 1; 348/207, 222; H04N 5/765, 5/77

(56) References Cited

U.S. PATENT DOCUMENTS 4,305,098 A * 12/1981 Mitchell ..................... 386/117

FOREIGN PATENT DOCUMENTS

GB 2 029 596 A 3/1980 ........... G03B/29/00

* cited by examiner

*Primary Examiner*—Robert Chevalier
(74) *Attorney, Agent, or Firm*—Darby & Darby

(57) ABSTRACT

A device for enabling images of television or computer video display screens to be incorporated into film footage without the presence of a roll bar modifies the video signal fed to a scanning electronic beam in response to a signal from the camera indicative of the frame rate in order to ensure that one full picture only is built up on the screen during the exposure of each film frame.

7 Claims, 3 Drawing Sheets

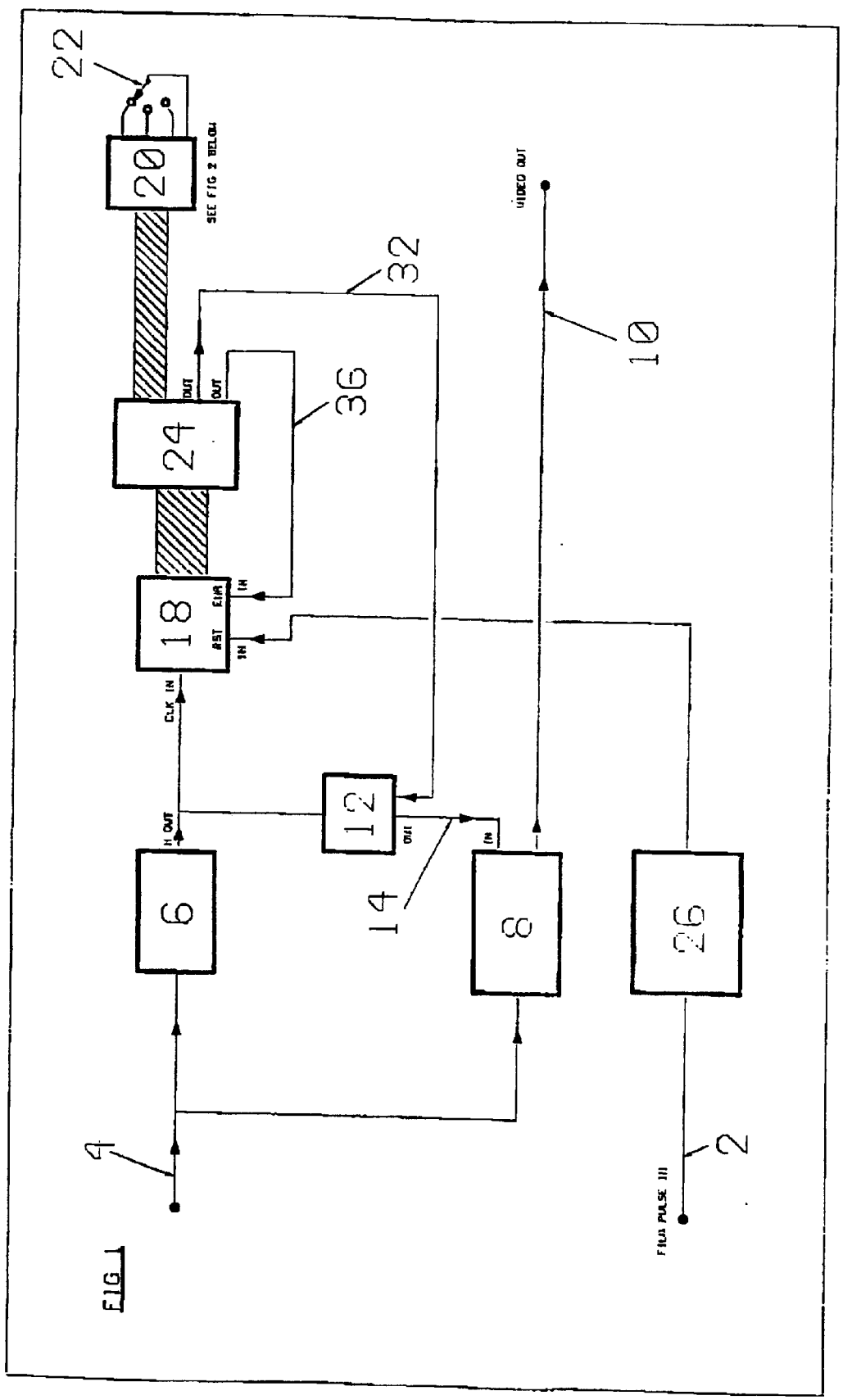

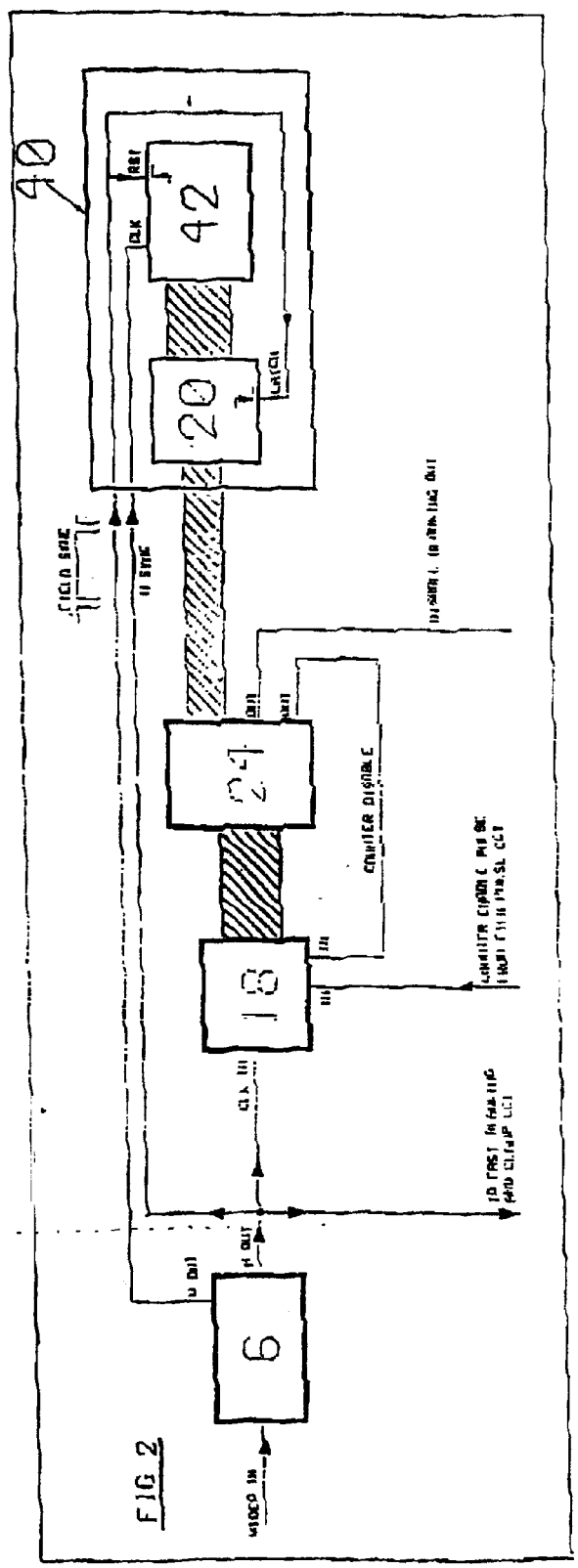

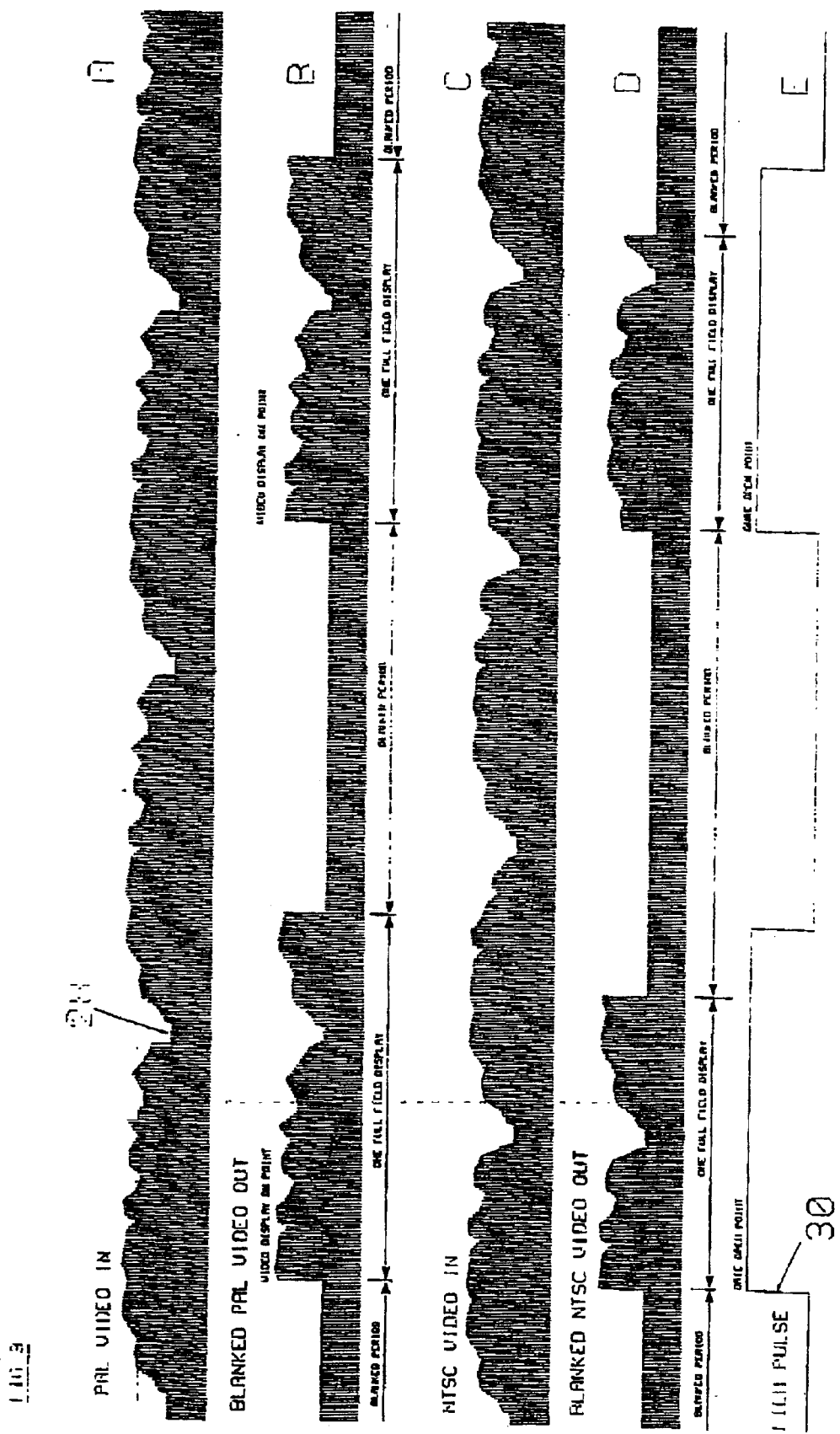

FILMING VIDEO DISPLAY SCREENS

BACKGROUND OF THE INVENTION

The present invention relates to a method of filming video display screens and to an adapter for controlling a video display screen from a camera during a filming session.

When a video display screen, such as a television screen or computer screen is filmed an effect is produced in which a dark or brightened up band appears on the screen when the film is processed. The image of the screen as it appears on the film also unacceptably flickers.

The problem is due to the mismatch between the rate at which the film is shot, typically twenty four or twenty five frames per second for a film camera, and the rate at which the display screen image is built up. These two rates are asynchronous. The bar which appears on the filmed image of the screen is described in the trade as a 'roll bar'.

Depending upon the type of display screen in use, the frame rate at which the picture on the video display screen is built up may vary. For example, on a television screen where the picture is made up of two fields of inter-laced lines, one full picture field of 312 lines in the PAL system is built up in one-fiftieth of a second in the United Kingdom or one-sixtieth of a second on a US screen for an NTSC standard field of 262 lines. Computer screens do not use inter-laced fields and the time to build up one full picture can vary between 1/50 and 1/85 of a second or greater.

The existing solutions to this technical problem are far from satisfactory and require that the film and video frame rates are the same to achieve synchronisation of the video and film frames.

TECHNICAL BACKGROUND

For short shots, a device sometimes known as a roll bar eliminator is used which must be manually adjusted every time the film starts. This device changes the speed of the film to make the film rate and the rate at which a picture builds up on the display the same. This approach causes other problems as the film is no longer running at the normal twenty four or twenty five frames per second. The adjustment is usually only stable for a very short period and it is only suitable for shots of less than a minute in duration. This is because the film transport is free running and will eventually drift out of synchronisation with the video display screen. Moreover it is only possible with this solution to correct for one video display screen in each film shot.

GB-A-2 029 596 in the name of the Secretary of State for Defense describes an example of apparatus for synchronously transferring TV pictures on to cine film. This device uses a rotary shutter blade which rotates at one rotation per three TV field scans. The control system synchronises a shutter opening signal with the TV video signal so that the shutter opens at the beginning of a field scan.

For major cinema projects it is known to modify each of the video display screens themselves so that the rate at which pictures build up is the same as the filming rate of the camera. This is done by the use of a standards converter. This usually involves employing an engineer to adjust each screen to be incorporated in any shot and considerably inhibits the director's ability to vary the film rate to gain appropriate effects during filming.

SUMMARY OF THE INVENTION

In order to resolve this technical problem, the present invention provides a device which does not require any adjustment to the frame rate of the camera or the normal video signal of the screen. In accordance with the invention a film camera is supplied with just one complete field of video information for each frame of film.

The present invention provides a device for use with a film camera which has a shutter and output means for providing an output timing signal responsive to the state of the shutter, said device being provided to enable filming of a clear image of a video display screen having an input for a video signal; said device supplying a modified video signal in response to said output timing signal to enable display of only one complete field of video information on the video display screen for each frame of film.

Preferably the device blanks the video signal other than for a period dependent on a duration of one field. This duration can be set by a selector switch or measured automatically by the device, allowing the same device to be fitted to different types of video display screen.

The device preferably comprises means for generating a blanking signal which is fed to the video signal input, and means operative in response to said output timing signal to remove the blanking signal for said one field period.

The approach of the present invention has the advantage that it allows the camera to be run at any desired rate, that several video display screens can easily be included in a single shot, and that the synchronisation can be maintained indefinitely.

Other aspects and advantages of the invention are defined in the appended claims.

BRIEF DESCRIPTION OF THE DRAWINGS

In order that the invention may be well understood, some embodiments thereof will now be described by way of example only, with reference to the diagrammatic drawings, in which:

FIG. 1 is a block diagram of a basic device for implementing the invention;

FIG. 2 is a block diagram of a modified device for automatically sensing the number of lines in a field of the video display screen to which it is attached;

FIG. 3A shows an exemplary PAL input video signal;

FIG. 3B shows the modified video signal output of FIG. 3A in accordance with the present invention;

FIG. 3C shows an exemplary NTSC input video signal;

FIG. 3D shows the modified video signal output of FIG. 3C in accordance with the present invention; and FIG. 3E shows an exemplary camera output timing signal.

DESCRIPTION OF A PREFERRED EMBODIMENT

FIG. 1 shows a block diagram of a basic device for implementing the invention. This device consists of an electronic circuit which may be inserted into a housing of a video display screen or provided as a separate unit which can be connected into the video line of the screen.

The device has an input 2 for an output timing signal from a film camera. Such an output timing signal is typically available from a film camera and gives timing information on both speed and phase of the shutter. The signals produced by different cameras will vary but in most cases there will be a change of state as the film gate and shutter open. A typical timing signal is illustrated as plot E in FIG. 3.

A second input 4 for the device is the video line which would normally be fed direct to a screen. The video input 4 is connected to a synchronisation signal separator circuit 6 and to a clamping and blanking circuit 8. The output of the clamping and blanking circuit 8 is a video output 10 of the device which is returned to the screen. The circuit 8 is supplied on line 14 with blanking pulses from a blanking pulse generator 12. The generator 12 a creates blanking pulses under the control of the horizontal sync signal from sync separator 6. When supplied with these blanking pulses on line 14 the blanking circuit 8 operates to send a blanking video signal to the output 10. When the output on line 14 is disabled the clamping and blanking circuit 8 passes the input video signal to the output 10 unaltered except for a short time delay.

The sync separator circuit 6 detects the conventional horizontal sync pulses which are provided as part of each video signal and represent the beginning and end of each line of video information. The output of the sync separator is fed as a clock input to a line counter circuit 18 which counts the field lines.

Since a picture field may be made up of a different number of lines depending on the standard to which the video display screen is operating, a selector circuit 20 is provided with a manual selector switch 22 which allows a user to set the number of lines in a complete picture field For example 312 if the video display screen is a PAL television monitor or 262 for NTSC or various different values for computer monitors. Depending on the selection made by the user, the selector circuit 20 outputs signals representing that number of lines to a blanking deactivator circuit 24 which also receives inputs representing the current count from the line counter 18.

The line counter 18 is enabled to start counting by the output of an edge detector circuit 26 connected to the first input 2. The line counter has a disable input 36 which is connected to the deactivator circuit 24 and disables the counter when the inputs from the line counter and selector circuit match. This input also resets the line counter 18 to zero.

The operation of the circuit will now be described by reference to FIGS. 3A–3E which shows at plots FIG. 3A and FIG. 3C typical video signals which may be supplied at input 4. Each field of information is shown as separated in a conventional manner by a short blanking vertical sync signal 28. In response to a rising edge change in state of the output timing signal (plot FIG. 3E) of a camera, which is detected by the edge detector circuit 26, the line counter 18 is caused to start counting from zero each line of the video signal which is fed on input 4.

The operation of the line counter 18 by the edge detector circuit 26 causes an output signal to be sent by the blanking deactivator circuit 24 on line 32 to blanking pulse generator 12. This disables the blanking pulse generator 12 allowing the clamping and blanking circuit 8 to allow the video signal input at 4 to pass on unmodified to output 10.

Once the count of the line counter 18 reaches the number set by the selector circuit 20 as detected by the blanking deactivator circuit 24 the output on line 32 changes state allowing the blanking pulse generator 12 to resume sending blanking pulses on line 14. This causes the blanking circuit 8 to blank the video signal from then on until the operation of the circuit is repeated in response to the next portion of the output timing signal which indicates that the shutter is once more open for a new frame of film to be shot. The blanking deactivator circuit 24 further provides a counter disable signal on line 36 to reset and disable the line counter 18 until it is next enabled by the edge detector circuit 26.

The effect of the operation of the device described in FIG. 1 on a video signal at the output 10 is clearly shown in plots FIG. 3B & FIG. 3D. Immediately after the rising edge of the output timing signal, the blanking is removed to allow one full video field to be displayed. It is immaterial whether this displayed field coincides with the start of a new scan on the video display screen at the top left hand corner. The complete field will be captured by the film camera without any brightness artifacts or roll bar.

When the video display screen receiving the modified signal is viewed directly, it will appear to show a pulsating picture which is synchronised to the rate of filming. Although such a strobe effect is observed at the video display screen itself, the image which appears on the film will be continuous and unimpaired by any roll bar.

A modification to the device of FIG. 1 is shown in FIG. 2. In this modification an automatic line selection circuit 40 is provided to detect from the video input signal the number of field lines making up a picture In this case the sync separator 6 detects both horizontal and vertical 28 sync signals and feeds these to a lines per field counter 42. The vertical sync signal is used to reset counter 42 and allow the horizontal sync signals to be counted in a lines per field control 20. The count is stopped by the next vertical sync signal and the stored count latched in the control 20. The stored count in the control. 20 then provides the input as before to the blanking deactivating circuit 24.

Such a modified device can easily be connected to any video display screen whatever standard it operates and will always provide the right modification to the video signal in order to ensure that just one complete field of video information is displayed on the video display screen for each frame of film shot.

What is claimed is:

1. A device for use with a film camera which has a shutter and output means for providing an output timing signal responsive to the state of the shutter, said device being provided to enable filming of a clear image of a video display screen having an input for a video signal; said device supplying a modified video signal in response to said output timing signal to enable display of only one complete field of video information on the video display screen for each frame of film; said device including means for generating a blanking signal which is fed to the video signal input, and means operative in response to said output timing signal to remove the blanking signal.

2. A device as claimed in claim 1, wherein the device blanks the video signal other than for a period dependent on a duration of one field.

3. A method of modifying a video signal of a video display screen in response to an output timing signal of a camera which changes state as a shutter of the camera is opened, in order to display only a single field on a video display screen while a shutter of the camera is open, comprising the step of blanking the video signal and removing the blanking signal for a period corresponding to the duration of a field in response to a change in state of the output timing signal.

4. A device for use with a film camera to enable filming of a clear image of a video display screen having an input for a video signal, said camera having a shutter and output means for providing an output timing signal responsive to a state of the shutter, comprising:

a sync separator circuit for receiving as input the video signal and generating a horizontal output;

a line counter circuit connected to receive as a first input the horizontal output of the sync separator circuit and generating an output;

a blanking deactivator circuit connected to the output of the line counter circuit, a first output of the blanking deactivator circuit being received as a second input to the line counter circuit to receive a reset and disable input signal;

a selector circuit connected to the blanking deactivator circuit for switching among a plurality of representative number of lines in a complete picture field;

a blanking pulse generator receiving as a first input the horizontal output from the sync separator circuit and a second input from a second output of the blanking deactivator circuit to receive a disable input signal, the blanking pulse generator generating output blanking pulses;

a clamping and blanking circuit receiving as a first input the video signal and as a second input the blanking pulses generated by the blanking pulse generator, the clamping and blanking circuit producing a video output signal; and an edge detector circuit for receiving as input the output timing signal responsive to the state of the shutter, an output of the edge detector circuit being connected as a third input to the line counter circuit.

5. A method, using the device as claimed in claim 1, for modifying a video signal of a video display screen in response to an output timing signal of a camera which changes state as a shutter of the camera is opened, in order to display only a single field on a video display screen while a shutter of the camera is open, comprising the steps of:

blanking the video signal and removing the blanking signal for a period corresponding to the duration of a field in response to a change in state of the output timing signal.

6. A device for use with a film camera to enable filming of a clear image of a video display screen having an input for a video signal, said camera having a shutter and output means for providing an output timing signal responsive to a state of the shutter, comprising:

a sync separator circuit for receiving as input the video signal and generating a horizontal output;

a line counter circuit connected to receive as a first input the horizontal output of the sync separator circuit and generating an output;

a blanking deactivator circuit connected to the output of the line counter circuit, a first output of the blanking deactivator circuit being received as a second input to the line counter circuit to receive a reset and disable input signal;

an automatic line selection unit for detecting from the video input signal a number of field lines in a complete picture field;

a blanking pulse generator receiving as a first input the horizontal output from the sync separator circuit and a second input from a second output of the blanking deactivator circuit to receive a disable input signal, the blanking pulse generator generating output blanking pulses;

a clamping and blanking circuit receiving as a first input the video signal and as a second input the blanking pulses generated by the blanking pulse generator, the clamping and blanking circuit producing a video output signal; and an edge detector circuit for receiving as input the output timing signal responsive to the state of the shutter, an output of the edge detector circuit being connected as a third input to the line counter circuit.

7. A method, using the device as claimed in claim 6, for modifying a video signal of a video display screen in response to an output timing signal of a camera which changes state as a shutter of the camera is opened, in order to display only a single field on a video display screen while a shutter of the camera is open, comprising the steps of:

blanking the video signal and removing the blanking signal for a period corresponding to the duration of a field in response to a change in state of the output timing signal.

* * * * *